US011974220B2

(12) United States Patent
Ishikawa et al.

(10) Patent No.: US 11,974,220 B2
(45) Date of Patent: Apr. 30, 2024

(54) NETWORK NODE AND REPORTING METHOD

(71) Applicant: NTT DOCOMO, INC., Tokyo (JP)

(72) Inventors: Hiroshi Ishikawa, Tokyo (JP); Shinya Takeda, Tokyo (JP); Maoki Hikosaka, Tokyo (JP); Atsushi Minokuchi, Tokyo (JP); Kenichiro Aoyagi, Tokyo (JP); Ban Al-Bakri, Juan les Pins (FR)

(73) Assignee: NTT DOCOMO, INC., Tokyo (JP)

( * ) Notice: Subject to any disclaimer, the term of this patent is extended or adjusted under 35 U.S.C. 154(b) by 162 days.

(21) Appl. No.: 17/420,856

(22) PCT Filed: Jan. 8, 2020

(86) PCT No.: PCT/JP2020/000299
§ 371 (c)(1),
(2) Date: Jul. 6, 2021

(87) PCT Pub. No.: WO2020/145299
PCT Pub. Date: Jul. 16, 2020

(65) Prior Publication Data
US 2022/0095213 A1    Mar. 24, 2022

(30) Foreign Application Priority Data
Jan. 9, 2019  (EP) .................................. 19315002

(51) Int. Cl.
*H04W 48/18* (2009.01)
*H04W 8/02* (2009.01)
*H04W 84/04* (2009.01)

(52) U.S. Cl.
CPC ............. *H04W 48/18* (2013.01); *H04W 8/02* (2013.01); *H04W 84/042* (2013.01)

(58) Field of Classification Search
CPC ...... H04W 48/18; H04W 8/02; H04W 84/042
See application file for complete search history.

(56) References Cited

U.S. PATENT DOCUMENTS

2007/0249338 A1* 10/2007 Schwalb ............... H04W 48/04
455/433
2020/0221281 A1* 7/2020 Rajadurai ............. H04W 60/00

FOREIGN PATENT DOCUMENTS

WO   2008/154942 A1   12/2008

OTHER PUBLICATIONS

International Search Report issued in PCT/JP2020/000299 dated Feb. 10, 2020 (5 pages).

(Continued)

*Primary Examiner* — Wayne H Cai
(74) *Attorney, Agent, or Firm* — Osha Bergman Watanabe & Burton LLP

(57) ABSTRACT

A network node is a first network node in a VPLMN (Visited Public land mobile network), the network node including a receiving unit configured to receive information relating to network selection, from a second network node in an HPLMN (Home Public land mobile network); a transmitting unit configured to transmit the information relating to network selection, to a user equipment; and a control unit configured to transmit, to the second network node, a response indicating that the user equipment was unable to receive the information relating to network selection, when a response, with respect to the information relating to network selection transmitted to the user equipment, is not received from the user equipment.

5 Claims, 5 Drawing Sheets

(56) References Cited

OTHER PUBLICATIONS

Written Opinion of the International Searching Authority issued in PCT/JP2020/000299 dated Feb. 10, 2020 (3 pages).
Extended European Search Report issued in counterpart European Patent Application No. 19315002.6, dated Jul. 3, 2019 (7 pages).
Ericsson et al.; "Correction for sending of Nudm_SDM_info"; 3GPP TSG-CT Meeting #82, CP-183134; Sorrento, Italy; Dec. 10-11, 2018 (7 pages).
3GPP TS 23.501 V15.3.0; "3rd Generation Partnership Project; Technical Specification Group Services and System Aspects; System Architecture for the 5G System; Stage 2 (Release 15)"; Sep. 2018 (226 pages).
Office Action issued in the counterpart Indian Patent Application No. 202117033251, dated Jan. 9, 2023 (5 pages).
Office Action issued in counterpart Chinese Patent Application No. 202080007959.1 dated May 4, 2023 (15 pages).

* cited by examiner

NETWORK NODE AND REPORTING METHOD

TECHNICAL FIELD

The present invention relates to a network node and a reporting method.

BACKGROUND ART

In 3GPP (3rd Generation Partnership Project), in order to realize a further increase in system capacity, a further increase in the data transmission speed, less delay in a radio section, etc., studies are being made with respect to a radio communication method referred to as 5G or NR (New Radio) (hereinafter, the radio communication method is referred to as "5G" or "NR"). In 5G, various radio technologies are being studied, in order to satisfy the requirement of setting the delay in the radio section to 1 ms or less while realizing a throughput of 10 Gbps or more.

In NR, studies are being made with respect to a network architecture including 5GC (5G Core Network) corresponding to EPC (Evolved Packet Core) that is the core network in the network architecture of LTE (Long Term Evolution), and NG-RAN (Next Generation-Radio Access Network) corresponding to E-UTRAN (Evolved Universal Terrestrial Radio Access Network) that is RAN (Radio Access Network) in the network architecture of LTE (for example, Non-Patent Document 1).

RELATED ART DOCUMENT

Non-Patent Document

Non-Patent Document 1: 3GPP TS 23.501 V15.3.0 (2018-09)

SUMMARY OF THE INVENTION

Problem to be Solved by the Invention

In NR, when a user equipment is connected to a network in the roaming environment, there have been cases where it is not possible to recognize whether SoR (Steering of Roaming) information, which is related to the control in selecting the PLMN (Public Land Mobile Network) to be prioritized, is acquired by the user equipment.

The present invention has been made in view of the above points, and it is an object of the present invention to enable a network to recognize the situation of a user equipment in a roaming environment.

Means for Solving the Problem

According to the disclosed technology, a network node that is a first network node in a VPLMN (Visited Public land mobile network) is provided, the network node including a receiving unit configured to receive information relating to network selection, from a second network node in an HPLMN (Home Public land mobile network); a transmitting unit configured to transmit the information relating to network selection, to a user equipment; and a control unit configured to transmit, to the second network node, a response indicating that the user equipment was unable to receive the information relating to network selection, when a response, with respect to the information relating to network selection transmitted to the user equipment, is not received from the user equipment.

Advantage of the Invention

The disclosed technology enables a network to recognize the situation of a user equipment in a roaming environment.

EMBODIMENTS OF THE INVENTION

Embodiments of the present invention will be described below with reference to the drawings. Note that the embodiments described below are merely examples, and embodiments to which the present invention is applied are not limited to the following embodiments.

In operations of a radio communication system according to the embodiment of the present invention, the existing technology is used as appropriate. The existing technology is, for example, existing LTE; however, the existing technology is not limited to existing LTE. Furthermore, the term "LTE" used in the present specification has a wide meaning including LTE-Advanced and LTE-Advanced or beyond (for example, NR), or wireless LAN (Local Area Network), unless otherwise specified.

Furthermore, in the embodiment of the present invention, the radio parameter, etc., being "configured" means that a predetermined value is "pre-configured", or a radio parameter, which is reported from a network node 10 or a user equipment 20, is configured.

Figure 1:
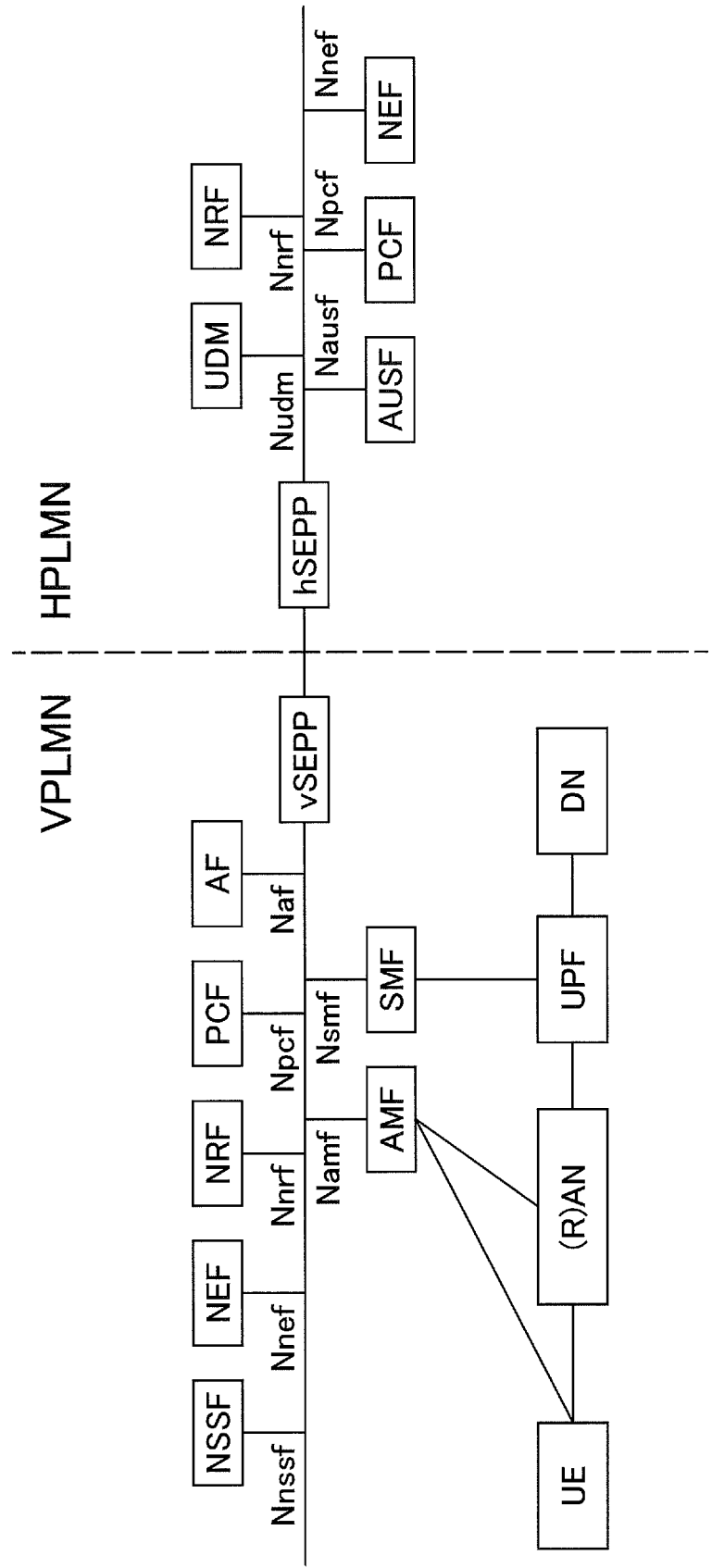
FIG. 1 is a diagram for describing a communication network according to an embodiment of the present invention.

FIG. 1 is a diagram for describing a communication network according to an embodiment of the present invention. As illustrated in FIG. 1, the network is formed of a UE, which is the user equipment 20, and a plurality of network nodes 10. Hereinafter, it is assumed that one network node 10 corresponds to each function; however, one network node 10 may implement a plurality of functions, or a plurality of network nodes 10 may implement one function. Furthermore, the "connection" described below may be a logical connection or a physical connection.

The RAN (Radio Access Network) is the network node 10 having a radio access function, and is connected to the UE, the AMF (Access and Mobility Management Function), and the UPF (User Plane Function). The AMF is the network node 10 having functions such as termination of a RAN interface, termination of NAS (Non-Access Stratum), registration management, connection management, reachability management, and mobility management, etc. The UPF is the network node 10 having functions such as a PDU (Protocol Data Unit) session point for external interconnection with a DN (Data Network), packet routing and forwarding, and QoS (Quality of Service) handling of a user plane, etc. The UPF and the DN constitute a network slice. In the radio communication network according to the embodiment of the present invention, a plurality of network slices may be constructed.

The AMF is connected to UE, RAN, SMF (Session Management function), NSSF (Network Slice Selection Function), NEF (Network Exposure Function), NRF (Network Repository Function), AUSF (Authentication Server Function), PCF (Policy Control Function), AF (Application Function), UDM (Unified Data Management), and SEPP (Security Edge Protection Proxy). AMF, SMF, NSSF, NEF, NRF, AUSF, PCF, AF, and UDM are the network nodes 10 that are connected to each other via interfaces based on the respective services, Namf, Nsmf, Nnssf, Nnef, Nnrf, Nausf, Npcf, Naf, and Nudm.

The SMF is the network node 10 having functions such as managing a session, allocating and managing an IP (Internet Protocol) address of the UE, a DHCP (Dynamic Host Configuration Protocol) function, an ARP (Address Resolution Protocol) proxy, and a roaming function, etc. The NEF is the network node 10 having a function of reporting capabilities and events to another NF (Network Function). The NSSF is the network node 10 having functions such as selecting a network slice to which the UE connects, determining permitted NSSAI (Network Slice Selection Assistance Information), determining NSSAI to be configured, and determining an AMF set to which the UE connects. The PCF is the network node 10 having a function of performing network policy control. The AF is the network node 10 having the function of controlling the application server. The UDM and AUSF are the network nodes 10 having the functions of generating authentication information, identifying users, and restricting access during roaming based on subscriber data, etc. The SEPP is a nontransparent proxy and filters control plane messages between the PLMNs (Public land mobile network). The vSEPP illustrated in FIG. 1 is the SEPP in a visited network, and the hSEPP is the SEPP in a home network.

As illustrated in FIG. 1, the UE is in a roaming environment connected to the RAN and the AMF in the VPLMN (Visited PLMN). The VPLMN and the HPLMN (Home PLMN) are connected via the vSEPP and the hSEPP. The UE can communicate with the UDM of the HPLMN, for example, via the AMF of the VPLMN.

An operator expands the HPLMN of the 5G system as illustrated in FIG. 1 and uses the SoR (Steering of Roaming) function on the control plane. Here, VPLMN also supports the 5G system.

Furthermore, the operator can redirect the SoR information to the UE, when the UE executes location registration in the VPLMN. The SoR information may include, for example, a PLMN list, an access technology list, information indicating that a list does not exist, and information indicating a request for a response when the information is correctly acquired, etc. Furthermore, for example, by executing one of or both of integrity protection and confidential protection with respect to the SoR information, the operator may improve the security against falsification of the SoR information.

The VPLMN cannot change the SoR information, which is supplied to the roaming UE from the HPLMN, without permission. The VPLMN can only transfer, to the roaming UE, the SoR information and a response indicating that the SoR information has been acquired by the UE, during the location registration procedure that is successful.

However, the location registration procedure is not necessarily successful, and may be rejected due to various factors.

Furthermore, the SoR information may be acquired by the UE at any time when the UE is in the connected mode. That is, the HPLMN may transmit the SoR information to the UE via the VPLMN. Here, similarly to the location registration procedure, there is a possibility that communication in the connected mode may fail. In the case where the AMF cannot supply SoR information to the UE, it is assumed that connection to the UE is not possible, for example, because the power of the UE is off or the UE is out of range.

As described above, during the location registration procedure, the HPLMN can supply SoR information to the UE. The SoR information is transmitted to the UE via the VPLMN, and the VPLMN cannot change the SoR information without permission. The VPLMN can transmit SoR information by including the SoR information in the location registration acceptance message.

However, during the location registration procedure, the UE may receive a rejection of location registration in the VPLMN. When location registration is rejected, SoR information supplied from UDM or AUSF of HPLMN, is not transferred to the UE by the VPLMN. Furthermore, the HPLMN cannot know whether the UE has acquired the SoR information.

Therefore, when the location registration is rejected during the location registration procedure, the VPLMN needs to report to the HPLMN that the SoR information, which is received by the VPLMN, has not been forwarded to the UE, due to the rejection of location registration.

Figure 2:
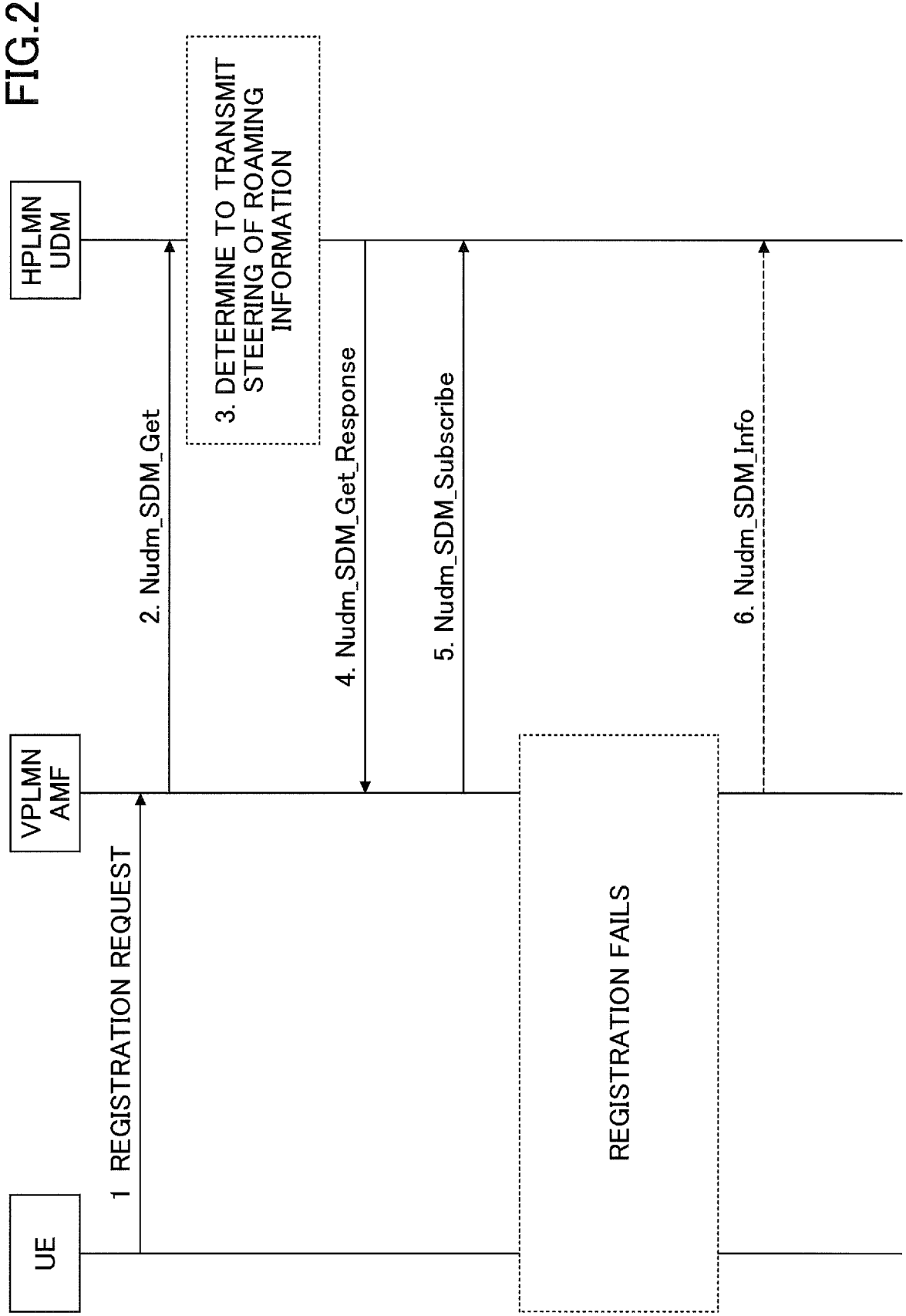
FIG. 2 is a sequence diagram for describing example (1) of the SoR processing method according to the embodiment of the present invention.

FIG. 2 is a sequence diagram for describing example (1) of the SoR processing method according to the embodiment of the present invention. Steps S1 to S5 in FIG. 2 are the same as the existing location registration procedure. In the following description of FIG. 2, "AMF" indicates AMF in VPLMN, and "UDM" indicates UDM and AUSF in HPLMN.

In step S1, the UE transmits "REGISTRATION REQUEST" to the AMF. "REGISTRATION REQUEST" is a message requesting location registration and includes, for example, AN (Access Network) parameters, SUCI (Subscription Concealed Identifier) or 5G-GUTI (5G Globally Unique Temporary Identifier) or PEI (Permanent Equipment Identifier), security parameters, information related to NSSAI, and update information of the UE radio capability, etc.

In step S2, the AMF transmits "Nudm_SDM_Get" to the UDM. "Nudm_SDM_Get" is a message requesting information from UDM, and is information requesting, for example, access and mobility subscription data, SMF selection subscription data, a UE context in SMF, etc.

In step S3, the UDM determines to transmit the SoR information. Subsequently, the UDM transmits "Nudm_SDM_Get_Response" to the AMF (step S4). "Nudm_SDM_Get_Response" includes information requested by "Nudm_SDM_Get" and SoR information. Subsequently, the AMF transmits "Nudm_SDM_Subscribe" to the UDM (step S5). "Nudm_SDM_Subscribe" is used to send a report to the UDM, when there is a change in the requested data.

When the location registration procedure is successful, after step S5, "REGISTRATION ACCEPT" including a transparent container including SoR information, is transmitted from the AMF to the UE, and then "REGISTRATION COMPLETE" is sent from the UE to the AMF. When "REGISTRATION COMPLETE" includes a transparent container including a response from the UE, the AMF includes a transparent container in the "Nudm_SDM_info" message to be transmitted to the UDM (step S6). When the UE responds to the security check of the SoR information transmitted in step S4, the UDM of the HPLMN verifies whether the response has been transmitted from the UE.

Here, when the AMF fails to transmit the SoR information due to some factor, "REGISTRATION COMPLETE" is not transmitted from the UE to the AMF. Therefore, the UDM cannot receive a response from the UE related to the SoR information.

Thus, when the location registration fails, the AMF includes information, which indicates that the transmission of the SoR information to the UE has failed, in "Nudm_SDM_info", and reports the "Nudm_SDM_info" to the UDM. The AMF may return the SoR information to the UDM, and the UDM may confirm the validity of the SoR information. By confirming that the transmitted SoR information has been returned, the UDM recognizes that the SoR has not been transferred to the UE. Furthermore, the AMF may report, to the UDM, the reason (cause) why the SoR information has not been transferred to the UE. For example, the reason may be that "location registration has been rejected".

Furthermore, for example, the data type "AcknowledgeInfo" included in "Nudm_SDM_info" may be extended to include information indicating that the transmission of the SoR information to the UE has failed.

Note that among the cases where the location registration procedure fails, there is a case where "REGISTRATION REJECT" is transmitted from the AMF to the UE after step S5 illustrated in FIG. 2. Therefore, the AMF may include the SoR information in "REGISTRATION REJECT" and transmit the "REGISTRATION REJECT" to the UE. By including the SoR information in "REGISTRATION REJECT" and transmitting the "REGISTRATION REJECT" to the UE, the AMF can transmit the SoR information to the UE even in a case where the location registration is rejected.

Figure 3:
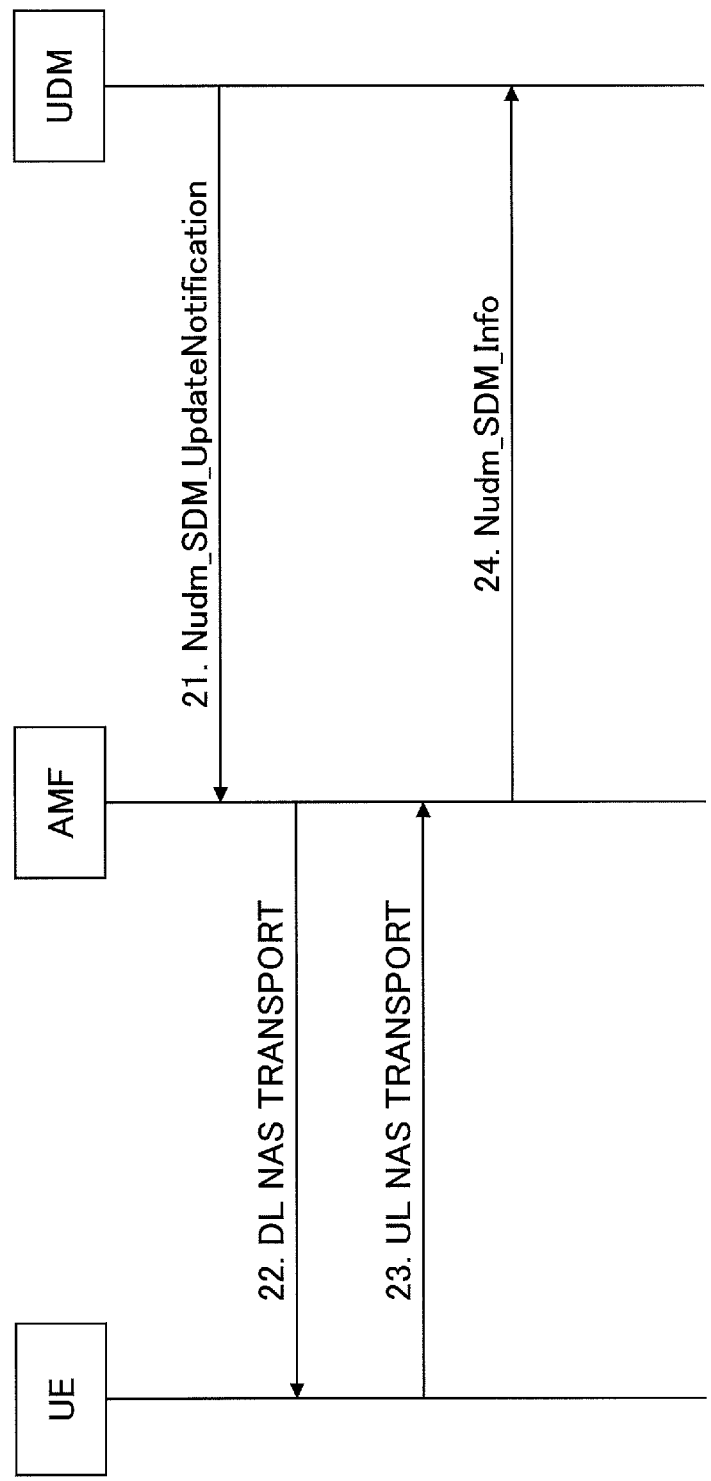
FIG. 3 is a sequence diagram for describing example (2) of the SoR processing method according to the embodiment of the present invention.

FIG. 3 is a sequence diagram for describing example (2) of the SoR processing method according to the embodiment of the present invention. In the following description of FIG. 3, "AMF" indicates AMF in VPLMN, and "UDM" indicates UDM in HPLMN.

In step S21, the UDM transmits "Nudm_SDM_UpdateNotification" to the AMF. "Nudm_SDM_UpdateNotification" includes SoR information.

In step S22, the AMF transmits a NAS message "DL NAS TRANSPORT" including SoR information, to the UE. Subsequently, in step S23, the UE transmits, to the AMF, "UL NAS TRANSPORT" including a response to the SoR information. When "UL NAS TRANSPORT" includes a transparent container including a response from the UE, the AMF includes the transparent container in the "Nudm_SDM_info" message transmitted to the UDM (step S24). When the UE responds to the security check of the SoR information transmitted in step S21, the UDM of the HPLMN verifies whether the response is transmitted from the UE.

Here, when transmission of the SoR information fails due to some factor (for example, failure to connect with the UE), "UL NAS TRANSPORT" will not be transmitted to the AMF. Therefore, the UDM cannot receive a response from the UE related to the SoR information.

Thus, when the NAS TRANSPORT fails, the AMF includes information, which indicates that the transmission of the SoR information to the UE has failed, in the "Nudm_SDM_info", and reports "Nudm_SDM_info" to the UDM. The AMF may return the SoR information to the UDM, and the UDM may confirm the validity of the SoR information. By confirming that the transmitted SoR information has been returned, the UDM recognizes that the SoR has not been transferred to the UE. Furthermore, the AMF may report, to the UDM, the reason why the SoR information has not been transferred to the UE. For example, the reason may be that "connection to the UE has failed". Furthermore, when the UDM/AUSF fails to transmit, to the UE, information other than the SoR information (for example, a report of a change in the Routing-ID indicating the destination of the accommodating UDM), the AMF may report, to the UDM, the other information or information indicating that the transmission of the other information has failed, by the same procedure.

According to the embodiment described above, the AMF, which is a network node, can execute a process to be performed when the AMF cannot transmit the SoR information to the UE. The AMF of the VPLMN can respond to the UDM of the HPLMN by returning the received SoR information to the UDM. Furthermore, the AMF of the VPLMN can transmit information indicating the reason for failing to transfer the SoR information to the UE, when returning a response related to the SoR information, to the UDM of the HPLMN. The UDM of the HPLMN can recognize that the transmission of the SoR information to the UE has failed, by confirming the validity of the returned SoR information.

The SoR information to be returned and information indicating the reason for failing to transfer the SoR information to the UE, can be included in the existing "Nudm_SDM_Info" message transmitted from the AMF to the UDM.

The operator can control roaming subscribers in the VPLMN based on business agreements and analysis of the cost-revenue. Furthermore, the operator can obtain the method of recognizing the situation of the UE.

That is, the network can recognize the situation of the user equipment in the roaming environment.

Apparatus Configuration

Next, a functional configuration example of the network node 10 and the user equipment 20 that execute the above-described processes and operations, will be described. The network node 10 and the user equipment 20 include functions for implementing the above-described embodiments. However, each of the network node 10 and the user equipment 20 may have only some of the functions of the embodiments.

<Network Node 10>

Figure 4:
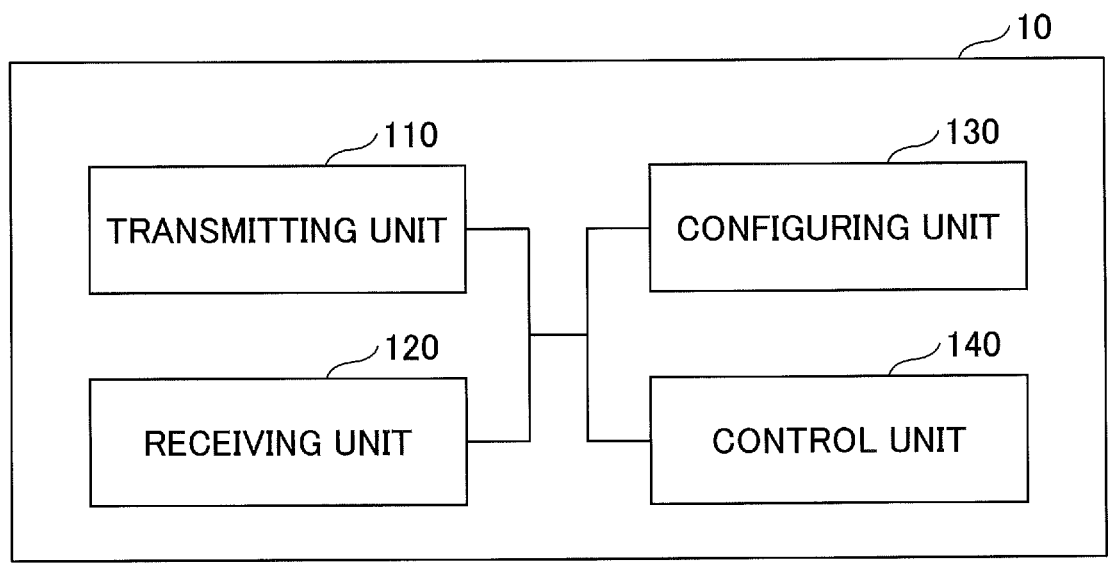
FIG. 4 is a diagram illustrating an example of a functional configuration of a network node 10 according to the embodiment of the present invention.

FIG. 4 is a diagram illustrating an example of a functional configuration of the network node 10. As illustrated in FIG. 4, the network node 10 includes a transmitting unit 110, a receiving unit 120, a configuring unit 130, and a control unit 140. The functional configuration illustrated in FIG. 4 is only an example. As long as the operations according to the embodiment of the present invention can be executed, the functional division and the name of the functional unit may be any functional division and name. Furthermore, the network node 10 having a plurality of different functions on the system architecture may be configured by a plurality of the network nodes 10 separated for each function.

The transmitting unit 110 includes a function of generating signals to be transmitted to the user equipment 20 or another network node 10, and transmitting the signals in a wired or wireless manner. The receiving unit 120 includes a function of receiving various signals transmitted from the user equipment 20 or another network node 10, and acquiring, for example, information of a higher layer from the received signals.

The configuring unit 130 stores pre-configured configuration information and various kinds of configuration information to be transmitted to the user equipment 20, in a storage device, and reads these pieces of information from the storage device as necessary. The content of the configuration information is, for example, subscriber information of the user equipment 20 and SoR information.

As described in the embodiment, the control unit 140 performs processing related to communication control of the user equipment 20 in the roaming environment. Furthermore, the control unit 140 performs processing related to reporting of SoR information to the user equipment 20. A functional unit related to signal transmission in the control unit 140, may be included in the transmitting unit 110, and a functional unit related to signal reception in the control unit 140, may be included in the receiving unit 120.

<User Equipment 20>

Figure 5:
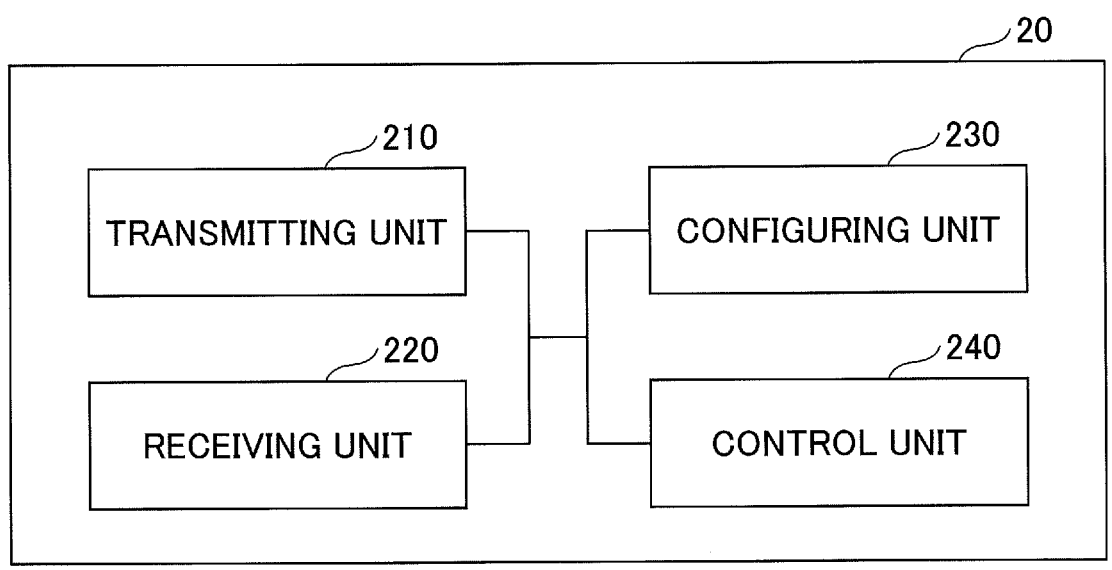
FIG. 5 is a diagram illustrating an example of a functional configuration of a user equipment 20 according to the embodiment of the present invention.

FIG. 5 is a diagram illustrating an example of a functional configuration of the user equipment 20. As illustrated in FIG. 5, the user equipment 20 includes a transmitting unit 210, a receiving unit 220, a configuring unit 230, and a control unit 240. The functional configuration illustrated in FIG. 5 is only an example. As long as the operations according to the embodiment of the present invention can be executed, the functional division and the name of the functional unit may be any functional division and name.

The transmitting unit 210 creates transmission signals from the transmission data and wirelessly transmits the transmission signals. The receiving unit 220 wirelessly receives various kinds of signals and acquires signals of a higher layer from the received signals of the physical layer. Furthermore, the receiving unit 220 has a function of receiving the NR-PSS, the NR-SSS, the NR-PBCH, the DL/UL control signal, or the reference signal, etc., transmitted from the network node 10.

The configuring unit 230 stores various kinds of configuration information received from the network node 10 by the receiving unit 220, in a storage device, and reads these pieces of information from the storage device as necessary. Furthermore, the configuring unit 230 also stores pre-configured configuration information. The content of the configuration information is, for example, subscriber information and SoR information.

As described in the embodiments, the control unit 240 performs processing related to communication control in the roaming environment. Furthermore, the control unit 240 performs processing related to control at the time of receiving SoR information. A functional unit related to signal transmission in the control unit 240, may be included in the transmitting unit 210, and a functional unit related to signal reception in the control unit 240, may be included in the receiving unit 220.

Hardware Configuration

The block diagrams (FIGS. 4 and 5) used for describing the embodiment described above are of blocks of functional units. These functional blocks (constituent units) are implemented by any combination of at least one of hardware and software. Methods for implementing each functional block are not particularly limited. That is, each functional block may be implemented by using one device in which elements are physically or logically combined, or two or more devices physically or logically separated may be directly or indirectly (for example, in a wired manner, a wireless manner) connected to each other, and each functional block may be implemented by these plural devices. The functional blocks may be implemented by combining software with the above one device or a plurality of devices.

The functions include determining, deciding, judging, calculating, computing, processing, deriving, investigating, searching, confirming, receiving, transmitting, outputting, accessing, resolving, selecting, adopting, establishing, comparing, assuming, expecting, considering, broadcasting, notifying, communicating, forwarding, configuring, reconfiguring, allocating, mapping, assigning, etc.; however, the functions are not limited as such. For example, a function block (constituent unit) that implements the transmission function is referred to as a transmitting unit or a transmitter. In any case, as described above, the implementation method is not particularly limited.

Figure 6:
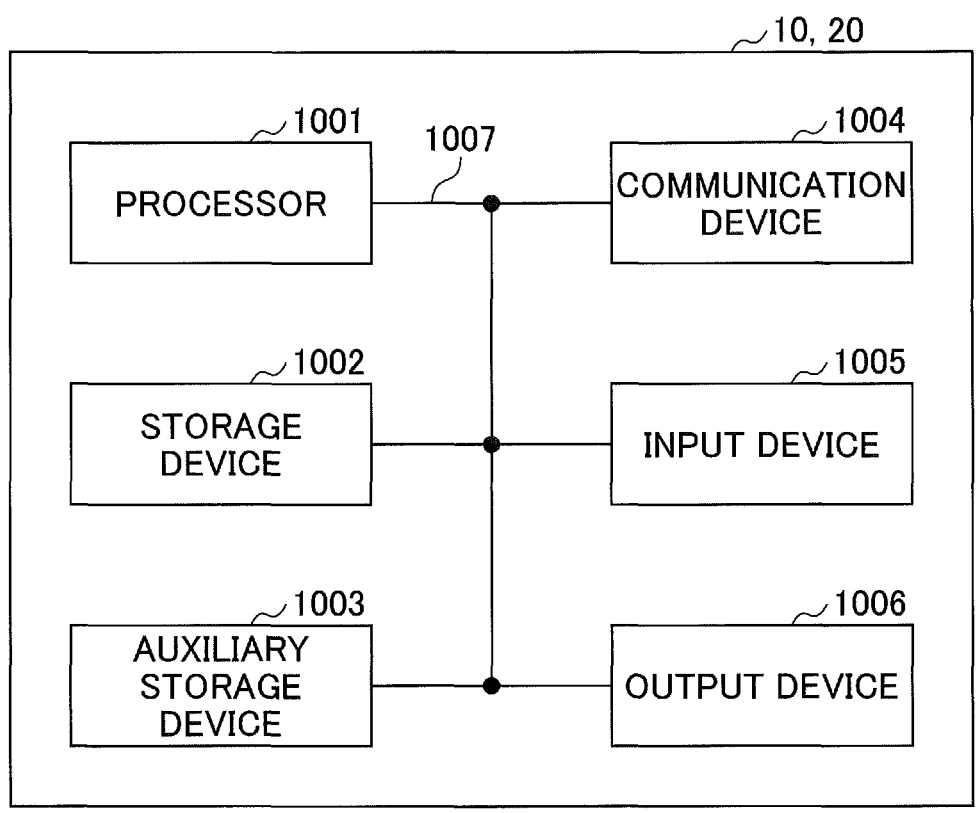
FIG. 6 is a diagram illustrating an example of a hardware configuration of the network node 10 or the user equipment 20 according to the embodiment of the present invention.

For example, the network node 10 and the user equipment 20, etc., according to the embodiment of the present disclosure may function as a computer that performs processes of the radio communication method according to the present disclosure. FIG. 6 is a diagram illustrating an example of a hardware configuration of the network node 10 and the user equipment 20 according to the embodiment of the present disclosure. The network node 10 and the user equipment 20 described above may be formed as a computer apparatus physically including a processor 1001, a storage device 1002, an auxiliary storage device 1003, a communication device 1004, an input device 1005, an output device 1006, a bus 1007, etc.

Note that in the following description, the term "device" can be read as a circuit, a device, a unit. The hardware configuration of the network node 10 and the user equipment 20 may be configured to include one or more devices illustrated in the figure, or may be configured to not include some of the devices.

The functions of the network node 10 and the user equipment 20 are implemented by loading predetermined software (program) in hardware such as the processor 1001 and the storage device 1002, computing by the processor 1001, controlling communication by the communication device 1004, and controlling at least one of reading and writing of data in the storage device 1002 and the auxiliary storage device 1003.

The processor 1001 operates, for example, the operating system to control the entire computer. The processor 1001 may be formed of a central processing unit (CPU) including an interface with a peripheral device, a control device, an arithmetic device, and a register. For example, the above control unit 140 and the control unit 240, etc., may be implemented by the processor 1001.

Furthermore, the processor 1001 loads a program (program code), a software module, or data, etc., from at least one of the auxiliary storage device 1003 and the communication device 1004, into the storage device 1002, and executes various processes according to the program, the software module, or the data. As the program, a program for causing a computer to execute at least part of the operations described in the above embodiment is used. For example, the control unit 140 of the network node 10 illustrated in FIG. 4 may be implemented by a control program stored in the storage device 1002 and operating on the processor 1001. Furthermore, the control unit 240 of the user equipment 20 illustrated in FIG. 5 may be implemented by a control program stored in the storage device 1002 and operating on the processor 1001. Although it has been described that the above-described various processes are executed by one processor 1001, the processes may be executed simultaneously or sequentially by two or more processors 1001. The processor 1001 may be implemented with one or more chips. Note that the program may be transmitted from the network via an electric communication line.

The storage device 1002 is a computer-readable recording medium and may be formed of at least one of a ROM (Read Only Memory), an EPROM (Erasable Programmable ROM), an EEPROM (Electrically Erasable Programmable ROM), and a RAM (Random Access Memory). The storage device 1002 may be referred to as a register, a cache, and a main memory, etc. The storage device 1002 can store executable programs (program codes), software modules, etc., for implementing the communication method according to the embodiment of the present disclosure.

The auxiliary storage device 1003 is a computer-readable recording medium, and may be formed of, for example, at least one of an optical disk such as a CD-ROM (Compact Disc ROM), a hard disk drive, a flexible disk, a magneto-optical disk (for example, a compact disk, a digital versatile disk, and a Blu-ray (registered trademark) disk), a smart card, a flash memory (for example, a card, a stick, and a key drive), a floppy (registered trademark) disk, and a magnetic strip, etc. The above-described storage medium may be, for example, a database including at least one of the storage device 1002 and the auxiliary storage device 1003, a server, or another appropriate medium.

The communication device 1004 is hardware (transmission/reception device) for performing communication between computers via at least one of a wired network and a wireless network, and is also referred to as a network device, a network controller, a network card, and a communication module, etc., for example. The communication device 1004 may be configured by including a high-frequency switch, a duplexer, a filter, a frequency synthesizer, etc., in order to implement at least one of frequency division duplex (FDD) and time division duplex (TDD). For example, a transmission/reception antenna, an amplifier unit, a transmission/reception unit, and a transmission line interface, etc., may be implemented by the communication device 1004. In the transmission/reception unit, the transmission unit and the reception unit may be physically or logically separated from each other.

The input device 1005 is an input device (for example, a keyboard, a mouse, a microphone, a switch, a button, and a sensor, etc.) that accepts input from the outside. The output device 1006 is an output device (for example, a display, a speaker, and an LED lamp, etc.) that performs output to the outside. Note that the input device 1005 and the output device 1006 may be integrated (for example, a touch panel).

Furthermore, the respective devices such as the processor 1001 and the storage device 1002 are connected by a bus 1007 for communicating information. The bus 1007 may be formed of a single bus or may be formed by using different buses between the devices.

Furthermore, the network node 10 and the user equipment 20 may include hardware such as a microprocessor, a digital signal processor (DSP), an application specific integrated circuit (ASIC), a programmable logic device (PLD), and a field programmable gate array (FPGA), and a part of or all of the functional blocks may be implemented by the hardware. For example, the processor 1001 may be implemented by using at least one of these hardware elements.

Overview of Embodiment

As described above, according to an embodiment of the present invention, a network node that is a first network node in VPLMN (Visited Public land mobile network) is provided, the network node including a receiving unit configured to receive information relating to network selection, from a second network node in HPLMN (Home Public land mobile network); a transmitting unit configured to transmit the information relating to network selection, to a user equipment; and a control unit configured to transmit, to the second network node, a response indicating that the user equipment was unable to receive the information relating to network selection, when a response, with respect to the information relating to network selection transmitted to the user equipment, is not received from the user equipment.

According to the above configuration, an AMF, which is a network node, can execute processing when the AMF cannot transmit SoR information to the UE. That is, the network can recognize the situation of the user equipment in a roaming environment.

The information relating to network selection may be SoR (Steering of Roaming) information. According to this configuration, when the SoR information cannot be transmitted to the UE, AMF that is the network node can transmit, to the UDM, a response indicating that the SoR information was not received by the UE.

The response, which indicates that the user equipment was unable to receive the information relating to network selection, may include the information relating to network selection received from the second network node. According to this configuration, the AMF of the VPLMN can respond to the UDM of the HPLMN by returning the received SoR information to the UDM. The UDM of the HPLMN can recognize that the transmission of the SoR information to the UE has failed by confirming the validity of the returned SoR information.

The response, which indicates that the user equipment was unable to receive the information relating to network selection, may include a reason why the response, with respect to the information relating to network selection transmitted to the user equipment, cannot be received from the user equipment. According to this configuration, the AMF of the VPLMN can transmit information indicating the reason for failing to transfer the SoR information to the UE, when sending the response related to the SoR information, to the UDM of the HPLMN.

Furthermore, according to an embodiment of the present invention, a network node that is a second network node in HPLMN (Home Public land mobile network) is provided, the network node including a transmitting unit configured to transmit information relating to network selection, to a first network node in VPLMN (Visited Public land mobile network); a receiving unit configured to receive, from the first network node, a response indicating that a user equipment was unable to receive the information relating to network selection, when the first network node is unable to receive, from the user equipment, a response with respect to the information relating to network selection transmitted to the user equipment from the first network node; and a control unit configured to identify the user equipment based on the response indicating that the user equipment was unable to receive the information relating to network selection.

According to the above configuration, the UDM of the HPLMN can recognize that the transmission of the SoR information to the UE has failed, by confirming the validity of the returned SoR information. That is, the network can recognize the situation of the user equipment in the roaming environment.

Furthermore, according to an embodiment of the present invention, a reporting method executed by a network node that is a first network node in VPLMN (Visited Public land mobile network) is provided, the reporting method including a receiving step of receiving information relating to network selection, from a second network node in HPLMN (Home Public land mobile network); a transmitting step of transmitting the information relating to network selection, to a user equipment; and a controlling step of transmitting, to the second network node, a response indicating that the user equipment was unable to receive the information relating to network selection, when a response, with respect to the information relating to network selection transmitted to the user equipment, is not received from the user equipment.

According to the above configuration, AMF, which is a network node, can execute processing when the AMF cannot transmit SoR information to the UE. That is, the network can recognize the situation of the user equipment in a roaming environment.

Supplement of Embodiment

The embodiment of the present invention is described above; however the disclosed invention is not limited to the embodiment, and a person ordinarily skilled in the art will appreciate various variations, modifications, alternatives, replacements, and so forth. Specific examples of numerical values are used in the description in order to facilitate understanding of the invention. However, these numerical values are merely an example, and any other appropriate values may be used, except as indicated otherwise. The separations of the items in the above description are not essential to the present invention. Depending on necessity, subject matter described in two or more items may be combined and used, and subject matter described in an item may be applied to subject matter described in another item (provided that they do not contradict). A boundary of a functional unit or a processor in the functional block diagrams may not necessarily correspond to a boundary of a physical component. An operation by a plurality of functional units may be physically executed by a single component, or an operation of a single functional unit may be physically executed by a plurality of components. The order of the processes in each of the processing procedures described in the embodiment may be re-arranged, provided that they do not contradict. For the convenience of description, the network node 10 and the user equipment 20 are described by using the functional block diagrams; however, such devices may be implemented in hardware, software, or combinations thereof. The software to be executed by the processor included in the network node 10 in accordance with the embodiment of the present invention and the software to be executed by the processor included in the user equipment 20 in accordance with the embodiment of the present invention may be stored in any appropriate storage medium, such as a random access memory (RAM), a flash memory, a read-only memory (ROM), an EPROM, an EEPROM, a register, a hard disk drive (HDD), a removable disk, a CD-ROM, a database, a server, and so forth.

Indication of information is not limited to the aspect or embodiment described in this disclosure and may be given by using any other method. For example, the notification of information may be given physical layer signaling (for example, Downlink Control Information (DCI), uplink control information (UCI)), higher layer signaling (for example, radio resource control (RRC) signaling, medium access control (MAC) signaling, broadcast information (master information block (MIB), system information block (SIB))), other signals, or a combination thereof. Further, the RRC signaling may be referred to as an "RRC message" and may be, for example, an RRC connection setup message, an RRC connection reconfiguration message, etc.

Each aspect and embodiment described in this disclosure is applicable to at least one of LTE, LTE-A, SUPER 3G, IMT-Advanced, 4G (4th generation mobile communication system), 5G (5th generation mobile communication system), NR(new Radio), future radio access (FRA), NR (New Radio), W-CDMA (registered trademark), GSM (registered trademark), CDMA2000, ultra-mobile broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), and systems using any other appropriate systems and next generation systems expanded on the basis of the systems. Furthermore, each aspect and embodiment described in this disclosure may be applied to a combination of a plurality of systems (for example, a combination of at least one of LTE and LTE-A, and 5G, etc.)

The processing procedures, the sequences, the flowcharts, etc., of the respective aspects/embodiments described in this specification may be reversed in order unless there is a contradiction. For example, the method described in this disclosure presents elements of various steps in an exemplary order and is not limited to a presented specific order.

In the present specification, a specific action that is supposed to be performed by the network node 10 may be performed by an upper node in some cases. In the network configured with one or a plurality of network nodes including the network node 10, various actions performed for communication with the user equipment 20 can be obviously performed by at least one of the network node 10 and any network node (for example, an MME or an S-GW, etc., is considered, but it is not limited thereto) other than the network node 10. The example in which the number of network nodes excluding the network node is one has been described above, but the other network nodes may be a combination of a plurality of other network nodes (for example, an MME and an S-GW).

Information or signals, etc., described in the present disclosure can be output from the higher layer (or the lower layer) to the lower layer (or the higher layer). Information, etc., may be input/output via a plurality of network nodes.

Input and output information, etc., may be stored in a specific place (for example, a memory) or may be managed by using a management table. Input and output information, etc., may be overwritten, updated, or additionally written. Output information, etc., may be deleted. Input information, etc., may be transmitted to another device.

The determination according to the present disclosure may be performed in accordance with a value (0 or 1) indicated by one bit, may be performed in accordance with a Boolean value (true or false), or may be performed by a comparison of numerical values (for example, a comparison with a value).

Software can be interpreted widely to mean a command, a command set, a code, a code segment, a program code, a program, a subprogram, a software module, an application, a software application, a software package, a routine, a subroutine, an object, an executable file, an execution thread, a procedure, a function, etc., regardless of whether software is called software, firmware, middleware, a microcode, a hardware description language, or any other name.

Further, software, commands, information, etc., may be transmitted and received via a transmission medium. For example, when software is transmitted from a web site, a server, or any other remote source using at least one of a wired technology (a coaxial cable, a fiber optic cable, a twisted pair, or a digital subscriber line (DSL), etc.) and a wireless technology (infrared rays or a microwave, etc.), at least one of the wired technology and the wireless technology is included in a definition of a transmission medium.

Information, signals, etc., described in the present disclosure may be indicated using any one of a variety of different techniques. For example, data, instructions, commands, information, signals, bits, symbols, chips, etc., which are mentioned throughout the above description may be indicated by voltages, currents, electromagnetic waves, magnetic particles, optical fields or photons, or an arbitrary combination thereof.

The terms described in this disclosure and terms necessary for understanding this specification may be replaced with terms having the same or similar meanings. For example, at least one of a channel and a symbol may be a signal (signaling).

Further, a signal may be a message. Further, a component carrier (CC) may be referred to as a "carrier frequency," a "cell," or a "frequency carrier", etc.

The terms "system" and "network" used in the present disclosure are used interchangeably.

Further, information, parameters, etc., described in the present disclosure may be indicated by using absolute values, may be indicated by using relative values from predetermined values, or may be indicated by using corresponding other information. For example, radio resources may be those indicated by an index.

The names used for the above-described parameters are not limited in any respect. Further, mathematical formulas, etc., using the parameters may be different from those explicitly disclosed in the present disclosure. Since various channels (for example, the PUCCH, the PDCCH, etc.) and information elements, etc., can be identified by suitable names, the various names allocated to the various channels and the information elements are not limited in any respect.

In the present disclosure, the terms "base station," "radio base station," "base station apparatus," "fixed station," "Node B," "eNodeB (eNB)," "gNodeB (gNB)," "access point," "transmission point," "reception point," "transmission/reception point," "cell," "sector," "sector group," "carrier," "component carrier" can be used interchangeably. The base station is also referred to as a macro cell, a small cell, a Femto cell, a pico cell, etc.

The base station can accommodate one or more (for example, three) cells. When the base station accommodates a plurality of cells, the entire coverage area of the base station can be divided into a plurality of smaller areas, and each smaller area can provide communication service through a base station subsystem (for example, a small indoor base station remote radio head (RRH)). The term "cell" or "sector" refers to part or all of the coverage area of at least one of the base station and the base station subsystem that performs communication service in the coverage.

In the present disclosure, terms such as "MS: Mobile Station", "user terminal", "UE: User Equipment", and "terminal", etc., can be used interchangeably.

The mobile station UE is also referred to as a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user agent, a mobile client, a client, or other appropriate terms.

At least one of the base station and the mobile station may be referred to as a transmission device, a reception device, a communication device, etc. Note that at least one of the base station and the mobile station may be a device mounted on a mobile body, the mobile body itself, etc. The mobile body may be a vehicle (for example, a car, an airplane, etc.), a mobile body that moves unmanned (for example, a drone, an automatically driven vehicle, etc.), or a robot (manned type or unmanned type). Note that at least one of the base station and the mobile station also includes a device which does not necessarily move during the communication operation. For example, at least one of the base station and the mobile station may be an IoT (Internet of Things) device such as a sensor.

Furthermore, the base station in the present disclosure may be read as a user terminal. For example, the communication between the base station and the user terminal is replaced with communication (for example, may be referred to as D2D (Device-to-Device), V2X (Vehicle-to-Everything)) between a plurality of user equipments 20, and each aspect/embodiment of the present disclosure may be applied to the configuration after replacement. In this case, the user equipment 20 may have the functions of the network node 10 described above. Furthermore, terms such as "uplink" and "downlink" may also be read as terms corresponding to inter-terminal communication (for example, "side"). For example, uplink channels, downlink channels, etc., may be read as side channels.

Similarly, the user terminal in the present disclosure may be read as a base station. In this case, the base station may include the functions of the above-described user terminal.

In some cases, the terms "determining" and "deciding" used in the disclosure include various operations. The terms "determining" and "deciding" can include, for example, "determination" and "decision" for judging, calculating, computing, processing, deriving, investigating, looking-up, or search inquiry (for example, looking-up in a table, a database, or other data structures), and ascertaining operations. In addition, the terms "determining" and "judging" can include "determination" and "decision" for receiving (for example, information reception), transmitting (for example, information transmission), input, output, and accessing (for example, accessing data in a memory) operations. The terms "determining" and "judging" can include "determination" and "decision" for resolving, selecting, choosing, establishing, and comparing operations. That is, the terms "determining" and "judging" can include "determination" and "decision" for any operation. Furthermore, "determining (deciding)" may be read as "assuming", "expecting", and "considering".

The terms "connected" and "coupled" or all of the modifications of the terms mean all of direct and indirect connections or couplings between two or more elements and can include a case in which one or more intermediate elements are present between two "connected" or "coupled" elements. The coupling or connection between elements may be physical coupling or connection, logical coupling or connection, or a combination thereof. For example, "connect" may be read as "access". In the disclosure, it can be considered that two elements are "connected" or "coupled"

to each other by using one or more electric wires, at least one of a cable and a printed electrical connection and by using electromagnetic energy with a wavelength in a radio frequency domain, a microwave domain, and an optical (both visible and invisible) domain as some non-restrictive and incomprehensive examples.

The reference signal can be abbreviated to RS and may be called a pilot signal according to the standard to be applied.

In the present disclosure, the term "on the basis of" used in the specification does not mean "on the basis of only" unless otherwise stated. In other words, the term "on the basis of" means both "on the basis of only" and "on the basis of at least".

In the present disclosure, any reference to elements with the names "first" and "second" used in the specification does not generally limit the number of elements or the order of the elements. These names can be used as a convenient method for distinguishing two or more elements in the disclosure. Therefore, a reference to the first and second elements does not mean that only two elements can be used or that the first element needs to precede the second element in some form.

The term "means" in the structure of each of the above-mentioned devices may be substituted with, for example, a "unit", a "circuit", or a "device".

In the present disclosure, when "include," "including," and modifications thereof are used, these terms are intended to be inclusive, similarly to the term "comprising". In addition, the term "or" used in the present disclosure does not mean exclusive OR.

The radio frame may be formed of one or more frames in the time domain. In the time domain, each of the one or more frames may be referred to as a subframe. The subframe may further include one or more slots in the time domain. The subframe may be a fixed time length (for example, 1 ms) independent of the numerology.

The numerology may be a communication parameter applied to at least one of transmission and reception of a certain signal or channel. The numerology may indicate at least one of, for example, a subcarrier spacing (SCS), a bandwidth, a symbol length, a cyclic prefix length, a transmission time interval (TTI), a number of symbols per TTI, a radio frame configuration, a particular filtering process performed in the frequency domain by the transceiver, a specific windowing process performed in the time domain by the transceiver, etc.

A slot may be formed of one or more symbols (OFDM (Orthogonal Frequency Division Multiplexing) symbol, SC-FDMA (Single Carrier Frequency Division Multiple Access) symbol, etc.) in the time domain. The slot may be a time unit based on the numerology.

A slot may include a plurality of minislots. Each minislot may be formed of one or more symbols in the time domain. Furthermore, the minislot may be referred to as a subslot. A minislot may be formed of fewer symbols than a slot. The PDSCH (or PUSCH) transmitted in units of time greater than the minislots, may be referred to as PDSCH (or PUSCH) mapping type A. The PDSCH (or PUSCH) transmitted using minislots may be referred to as PDSCH (or PUSCH) mapping type B.

Radio frames, subframes, slots, minislots, and symbols all represent time units for transmitting signals. Radio frames, subframes, slots, minislots, and symbols may respectively be referred to by different names.

For example, one subframe may be referred to as a transmission time interval (TTI), or a plurality of consecutive subframes may be referred to as a TTI, or one slot or one minislot may be referred to as a TTI. That is, at least one of a subframe and TTI may be a subframe (1 ms) in existing LTE, a period shorter than 1 ms (for example, 1-13 symbols), or a period longer than 1 ms. Note that the unit representing TTI may be referred to as a slot, a minislot, etc., instead of a subframe.

Here, the TTI refers to the minimum time unit of scheduling in radio communication, for example. For example, in the LTE system, the base station performs scheduling for allocating radio resources (frequency bandwidth, transmission power, etc., that can be used in each user equipment 20) in units of TTIs, to each user equipment 20. Note that the definition of TTI is not limited as such.

The TTI may be a transmission time unit such as a channel coded data packet (transport block), a code block, a codeword, etc., or may be a processing unit such as scheduling, link adaptation, etc. Note that when a TTI is given, a time interval (for example, the number of symbols) in which a transport block, a code block, a code word, etc., is actually mapped, may be shorter than the TTI.

Note that when one slot or one minislot is referred to as a TTI, one or more TTIs (i.e., one or more slots or one or more minislots) may be the minimum time unit of scheduling. Also, the number of slots (the number of minislots) constituting the minimum time unit of the scheduling, may be controlled.

A TTI having a time length of 1 ms may be referred to as a regular TTI (TTI in LTE Rel. 8-12), a normal TTI, a long TTI, a regular subframe, a normal subframe, a long subframe, a slot, etc. A TTI shorter than the regular TTI may be referred to as a reduced TTI, a short TTI, a partial or fractional TTI, a reduced subframe, a short subframe, a minislot, a subslot, a slot, etc.

Note that a long TTI (for example, a regular TTI, a subframe, etc.) may be read as a TTI having a time length exceeding 1 ms, and a short TTI (for example, a reduced TTI, etc.) may be read as a TTI having a TTI length that is less than the TTI length of the long TTI and greater than or equal to 1 ms.

The resource block (RB) is a resource allocation unit in the time domain and the frequency domain, and may include one or more consecutive subcarriers in the frequency domain. The number of subcarriers included in the RB may be the same irrespective of the numerology, for example, the number may be 12. The number of subcarriers included in the RB may be determined based on the numerology.

Furthermore, the time domain of the RB may include one or more symbols, and may have a length of one slot, one minislot, one subframe, or one TTI. Each TTI, each subframe, etc., may be formed of one or more resource blocks.

Note that one or more RBs may be referred to as a physical resource block (PRB), a subcarrier group (SCG: Sub-Carrier Group), a resource element group (REG: Resource Element Group), a PRB pair, and an RB pair, etc.

Furthermore, the resource block may be formed of one or more resource elements (RE). For example, the one RE may be a radio resource area of one subcarrier and one symbol.

A bandwidth part (BWP) (which may be referred to as partial bandwidth) may represent a subset of consecutive common resource blocks (RBs) for a certain numerology, in a certain carrier. Here, the common RB may be identified by the index of the RB based on the common reference point of the carrier. The PRB may be defined by a certain BWP and numbered in the BWP.

The BWP may include BWP for UL (UL BWP) and BWP for DL (DL BWP). For the UE, one or more BWPs may be configured within one carrier.

At least one of the configured BWPs may be active, and the UE does not have to assume transmitting and receiving predetermined signals/channels outside of the active BWP. Note that a "cell", a "carrier", etc., in the present disclosure may be read as "BWP".

Structures such as the radio frames, subframes, slots, minislots, and symbols described above are merely illustrative. For example, configurations such as the number of subframes included in the radio frame, the number of slots per subframe or radio frame, the number of minislots included in the slot, the number of symbols and RBs included in the slot or minislot, the number of subcarriers included in the RB, the number of symbols in the TTI, the symbol length, the cyclic prefix (CP) length, etc., may be variously changed.

In the present disclosure, if an article is added by translation, such as a, an, the, etc., in English, the present disclosure may include a case where the noun following the article is plural.

In the present disclosure, the term "A and B are different" may mean "A and B are different from each other". Note that this term may mean "A and B are each different from C". Terms such as "separated", "coupled", etc., may also be interpreted in the same manner as "different".

Each aspect/embodiment described in the present disclosure may be used singly or in combination, or may be used by being switched in accordance with the execution. Furthermore, reporting of predetermined information (for example, reporting "being X") is not limited to being reporting explicitly; this may be done implicitly (for example, not reporting the predetermined information).

Note that the AMF in the present disclosure is an example of a first network node. UDM is an example of a second network node.

Although the present disclosure has been described in detail, it is apparent to those skilled in the art that the present disclosure is not limited to the embodiments as described in the present disclosure. The present disclosure can be implemented as modifications and variations without departing from the sprit and scope of the present disclosure as defined in claims. Thus, the description in the present disclosure is intended for exemplary description and does not mean any restriction to the present disclosure.

This international patent application is based on and claims priority to European Patent Application No. 19315002.6 filed on Jan. 9, 2019, and the entire content of European Patent Application No. 19315002.6 is incorporated herein by reference.

LIST OF REFERENCE SYMBOLS

1 base station
2 mobile station
101 signal transmission unit
102 reference signal generation unit 102
103 data generation unit
201 signal reception unit
202 channel acquisition unit
203 estimation unit
204 data acquisition unit
301 RF module
302 BB processing module
303 apparatus control module
304 communication IF
401 RF module
402 BB processing module
403 UE control module

The invention claimed is:

1. A network node that is a first network node in a Visited Public land mobile network (VPLMN), the network node comprising:
   a receiver configured to receive information relating to network selection, from a second network node in a Home Public land mobile network (HPLMN); and
   a transmitter configured to transmit, to the second network node, a response indicating that the information relating to network selection was unable to be transmitted to a terminal, when the information relating to network selection was unable to be transmitted to the terminal,
   wherein the response indicating that the information relating to network selection was unable to be transmitted to the terminal includes a reason why the information relating to network selection has not been transferred to the terminal, and the response indicating that the information relating to network selection was unable to be transmitted to the terminal does not include a transparent container, the transparent container being to be received by the first network node from the terminal if the first network node transmits a REGISTRATION Accept message to the terminal, and
   wherein the reason why the information relating to network selection has not been transferred to the terminal indicates that the terminal is unconnectable.

2. The network node of claim 1, wherein the information relating to network selection is Steering of Roaming (SoR) information.

3. A network node that is a second network node in a Home Public land mobile network (HPLMN), the network node comprising:
   a transmitter configured to transmit information relating to network selection to a first network node in a Visited Public land mobile network (VPLMN); and
   a receiver configured to receive, from the first network node, a response indicating that the information relating to network selection was unable to be transmitted to a terminal, when the first network node was unable to transmit the information relating to network selection to the terminal,
   wherein the response indicating that the information relating to network selection was unable to be transmitted to the terminal includes a reason why the information relating to network selection has not been transferred to the terminal, and the response indicating that the information relating to network selection was unable to be transmitted to the terminal does not include a transparent container, the transparent container being to be received by the first network node from the terminal if the first network node transmits a REGISTRATION Accept message to the terminal, and
   wherein the reason why the information relating to network selection has not been transferred to the terminal indicates that the terminal is unconnectable.

4. A network system comprising: a first network node of a Visited Public land mobile network (VPLMN); and a second network node in a Home Public land mobile network (HPLMN),
   wherein the first network node includes
      a first receiver configured to receive information relating to network selection, from the second network node; and
      a first transmitter configured to transmit, to the second network node, a response indicating that the information relating to network selection was unable to be transmitted to a terminal, when the information relating to network selection was unable to be transmitted to the terminal, wherein the response indicating that the information relating to network selection was unable to be transmitted to the terminal includes a reason why the information relating to network selection has not been transferred to the terminal, and the response indicating that the information relating to network selection was unable to be transmitted to the terminal does not include a transparent container, the transparent container being to be received by the first network node from the terminal if the first network node transmits a REGISTRATION Accept message to the terminal, and wherein the reason why the information relating to network selection has not been transferred to the terminal indicates that the terminal is unconnectable, and wherein the second network node includes
- a second transmitter configured to transmit the information relating to network selection to the first network node; and
- a second receiver configured to receive, from the first network node, the response indicating that the information relating to network selection was unable to be transmitted to the terminal.

5. A reporting method executed by a network node that is a first network node in a Visited Public land mobile network (VPLMN), the reporting method comprising:

receiving information relating to network selection, from a second network node in a Home Public land mobile network (HPLMN); and transmitting, to the second network node, a response indicating that the information relating to network selection was unable to be transmitted to a terminal, when the information relating to network selection was unable to be transmitted to the terminal, wherein the response indicating that the information relating to network selection was unable to be transmitted to the terminal includes a reason why the information relating to network selection has not been transferred to the terminal, and the response indicating that the information relating to network selection was unable to be transmitted to the terminal does not include a transparent container, the transparent container being to be received by the first network node from the terminal if the first network node transmits a REGISTRATION Accept message to the terminal, and wherein the reason why the information relating to network selection has not been transferred to the terminal indicates that the terminal is unconnectable.

* * * * *